(12) United States Patent
Davis et al.

(10) Patent No.: US 11,952,221 B2
(45) Date of Patent: Apr. 9, 2024

(54) DYNAMIC PACKAGE SORTATION DEVICE

(71) Applicant: Express Scripts Strategic Development, Inc., St. Louis, MO (US)

(72) Inventors: Michael L. Davis, Edwardsville, IL (US); Robert E. Hoffman, Linden, IN (US); Kristine Calvin, Troy, IL (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 146 days.

(21) Appl. No.: 17/551,354

(22) Filed: Dec. 15, 2021

(65) Prior Publication Data

US 2022/0185597 A1 Jun. 16, 2022

Related U.S. Application Data

(60) Provisional application No. 63/125,441, filed on Dec. 15, 2020.

(51) Int. Cl.
*B65G 47/51* (2006.01)
*B65G 43/08* (2006.01)
*B65G 47/31* (2006.01)

(52) U.S. Cl.
CPC .......... *B65G 47/5145* (2013.01); *B65G 43/08* (2013.01); *B65G 47/31* (2013.01); *B65G 47/5122* (2013.01)

(58) Field of Classification Search
CPC ............... B65G 47/31; B65G 47/5168; B65G 47/5145; B65G 43/08
USPC .............................................. 198/812, 347.1
See application file for complete search history.

(56) References Cited

U.S. PATENT DOCUMENTS

| | | | | |
|---|---|---|---|---|
| 4,140,627 A | * | 2/1979 | Weller | B07C 3/00 |
| | | | | 209/3.3 |
| 4,711,357 A | * | 12/1987 | Langenbeck | B65G 47/766 |
| | | | | 209/652 |
| 5,351,809 A | * | 10/1994 | Gilmore | B65G 21/14 |
| | | | | 198/594 |
| 5,423,413 A | * | 6/1995 | Gilmore | B65G 13/12 |
| | | | | 198/594 |
| 6,622,063 B1 | | 9/2003 | Moritz | |
| 7,390,986 B2 | | 6/2008 | McDonald | |
| 8,141,330 B2 | | 3/2012 | Henkel | |
| 8,996,157 B2 | | 3/2015 | Collin | |
| 9,827,598 B2 | | 11/2017 | Robbins | |

(Continued)

OTHER PUBLICATIONS

Kim, et al., Mailing Sorter Having Parallel Delivery Conveyors and Parallel sorting conveyors with Chain-Speed Mail Separation, WO 2022050649 (Year: 1979).*

*Primary Examiner* — Gene O Crawford
*Assistant Examiner* — Lester Rushin, III
(74) *Attorney, Agent, or Firm* — Dickinson Wright PLLC

(57) ABSTRACT

The dynamic package sortation device includes a track for handling a plurality of packages is provided. At least one conveyor extends away from the track towards at least two shipping containers. The at least one conveyor is extendable and retractable for dispensing the packages into a first shipping container of the at least two shipping containers and a second condition for dispensing the packages into a second shipping container of the at least two shipping containers. A controller is provided for providing an instruction to move the at least one conveyor between the first condition and the second condition based on a trigger.

19 Claims, 10 Drawing Sheets

(56) References Cited

U.S. PATENT DOCUMENTS

| | | | |
|---|---|---|---|
| 9,955,703 B2 | 5/2018 | Johnson | |
| 10,058,897 B2 | 8/2018 | Wojdyla | |
| 10,106,330 B2 | 10/2018 | Maines | |
| 10,127,514 B2 | 11/2018 | Napoli | |
| 10,494,126 B2 | 12/2019 | Joplin | |
| 10,494,192 B2 * | 12/2019 | DeWitt | B65G 43/08 |
| 10,618,745 B2 * | 4/2020 | Wagner | B65G 47/12 |
| 10,643,169 B2 | 5/2020 | Hoffman | |
| 10,730,653 B2 | 8/2020 | Christopher | |
| 10,745,162 B2 | 8/2020 | Joplin | |
| 10,899,548 B2 * | 1/2021 | Sachs | B65G 15/24 |
| 10,916,340 B2 | 2/2021 | Hawkes | |
| 11,004,553 B2 | 5/2021 | Wollschleger | |
| 2006/0113223 A1 | 6/2006 | Quine | |
| 2016/0042320 A1 | 2/2016 | Dearing | |
| 2016/0137328 A1 | 5/2016 | Paynter | |
| 2017/0157648 A1 | 6/2017 | Wagner | |
| 2018/0154398 A1 * | 6/2018 | Layne | B65G 47/64 |
| 2019/0160493 A1 * | 5/2019 | Garrett | B07C 3/082 |

\* cited by examiner

DYNAMIC PACKAGE SORTATION DEVICE

CROSS-REFERENCE TO RELATED APPLICATION

This application claims priority to U.S. Provisional Patent Application No. 63/125,441, entitled "DYNAMIC PACKAGE SORTATION DEVICE" and filed on Dec. 15, 2020, and this application is incorporated herein by reference.

FIELD

The present disclosure is related generally to a package sorter assembly for automatically guiding packages into a plurality of shipping containers.

BACKGROUND

In one type of high volume pharmacy, a plurality of filled packages are fed to a sortation device which deposits those packages into a plurality of shipping containers for shipping to different locations. However, in many cases, it is necessary to temporarily halt the use of the sortation device when either a shipping container is exchanged for an empty shipping container or when a shipping container is scheduled to be picked up by a shipping delivery service. This down time may reduce the through put of the high volume pharmacy, thereby increasing the cost of each package that is filled and shipped. There is thus a continuing need for a sortation device which can distribute packages into shipping containers in a more efficient manner with either no or minimal down time.

SUMMARY

According to one aspect of the present disclosure, a sortation device including a track for handling a plurality of packages is provided. At least one conveyor extends away from the track towards at least two shipping containers. The at least one conveyor is extendable and retractable for dispensing the packages into a first shipping container of the at least two shipping containers and a second condition for dispensing the packages into a second shipping container of the at least two shipping containers. A controller is provided for providing an instruction to move the at least one conveyor between the first condition and the second condition based on a trigger.

In an embodiment, the at least one conveyor includes a first belt and a second belt, and at least one of the first and second belts can be moved relative to the other. In an example, the first belt is stationary and the second belt is moveable between a first dispensing position and a second dispensing position.

In an embodiment, the first belt is an upper belt, and the second belt is a lower belt that is located vertically below the upper belt. In an example, a protective barrier is intermediate the lower belt and the upper belt to prevent a package from traveling between the upper belt and the lower belt.

In an embodiment, the lower belt can move from a first position that is directly below the upper belt and a second position wherein the lower belt extends past the upper belt.

In an embodiment, the lower belt includes at least two pulleys that are operably coupled with at least one pulley track that guides the movement of the lower belt relative to the upper belt.

In an embodiment, the lower belt includes at least two pulleys that are operably coupled with at least one pulley track that guides the movement of the lower belt relative to the upper belt.

In an embodiment, the at least one shipping container includes a first shipping container and a second shipping container that are positioned adjacent one another. When the at least one conveyor is in the retracted condition, the packages are dispensed into the first shipping container, and when the at least one conveyor is in the extended condition, the packages are dispensed into the second shipping container. In an example, the controller sends a signal to position the at least one conveyor to have its exit end at an assigned shipping container, which can be capable of holding a plurality of packages.

In an embodiment, the at least one conveyor is a first conveyor and the first and second shipping containers are a first set of shipping containers and further including a second conveyor and a second set of shipping containers and wherein the second conveyor is extendable and retractable so that it can dispense packages into any of the second set of shipping containers.

In an embodiment, at least one swing gate is located along the track and able to articulate between a non-deflecting position and a deflecting position and wherein the at least one swing gate can deflect at least one package from the track to the at least one conveyor when the at least one swing gate is in the deflecting position. In an example, the swing gate includes a bomb bay type door that drops a package from a main circulating track (e.g., a main conveyance system) to the at least one conveyor that moves the package to an assigned shipping container.

According to another aspect of the present disclosure, a method of dispensing packages into at least two shipping containers including a first shipping container and a second shipping container is provided. The method includes the step of guiding at least one of the packages onto at least one conveyor and then into the first shipping container. The method proceeds with the step of extending the at least one conveyor. The method continues with the step of guiding at least one of the packages onto the at least one conveyor and then into the second shipping container. In an example, the package is dropped from above onto the at least conveyor.

In an embodiment, the at least one conveyor includes a first belt and a second belt, and the step of extending the at least one conveyor includes moving one of the first and second belts relative to the other of the first and second belts.

In an embodiment, the first belt is an upper belt and the second belt is a lower belt, and the step of extending the at least one conveyor includes moving the lower belt from a retracted position vertically below the upper belt to an extended position where the lower belt extends outwardly past an end of the upper belt.

In an embodiment, the lower belt includes at least two pulleys that are disposed along at least one pulley track and wherein movement of the lower belt involves moving the at least two pulleys along the at least one pulley track.

In an embodiment, the method further includes the step of determining with a controller if a trigger event has occurred, and the step of extending the at least one conveyor takes place in response to the controller determining that the trigger event has occurred.

In an embodiment, the trigger event is a set time of day or predetermined time. In an example embodiment, the trigger event is the pick-up time of a courier service to remove the shipping container from the facility and begin the process of delivering the individual packages in the shipping container. The shipping containers aligned with a single exit conveyor may be assigned to different triggers, e.g., different pick up times for a same courier or different pick up times for different couriers.

In an embodiment, the at least one conveyor includes a plurality of conveyors and wherein each of the plurality of conveyors is extendable and retractable and is configured to deposit packages into one shipping container when in a retracted condition and into another shipping container when in an extended condition. The controller can set an initial position of the exit conveyor based on the number of packages and the assigned carrier, courier or delivery methodology. The controller can also control the position of the conveyor in real-time based at least in part on the position of the package on the circulation track and the current position of the package on the track. The controller can also control the position of the conveyor based at least in part on the quantity of the packages in the assigned shipping container.

In an embodiment, the plurality of conveyors can be extended and retracted independently of one another. A controller can send control signals to position the plurality of conveyors at the start of the sortation process. In an example, the controller can send control systems to position the conveyors during the sortation process, e.g., in real-time during the package sortation to the shipping containers.

Yet another aspect of the present disclosure is related to a package sortation assembly that includes a main track for handling a plurality of packages. The package sortation assembly further includes a plurality of sets of shipping containers. The plurality of sets of shipping containers includes at least two shipping containers that are arranged adjacent one another. A plurality of conveyors are spaced apart from one another along the main track. The conveyors extend from the main track towards respective ones of the sets of shipping containers and are individually extendable and retractable. A controller is in communication with the plurality of conveyors and is configured to selectively extend and retract the conveyors to control which shipping containers in the sets the packages are dispensed into.

In an embodiment, the at least one conveyor includes a first belt and a second belt and wherein at least one of the first and second belts can be moved relative to the other of the first and second belts.

In an embodiment, the first belt is an upper belt and the second belt is a lower belt that is located vertically below the upper belt.

In an embodiment, the lower belt can move from a first position that is directly below the upper belt and a second position with the lower belt extending past the upper belt.

BRIEF DESCRIPTION OF THE DRAWINGS

These and other features and advantages of the present disclosure will become more readily appreciated when considered in connection with the following description of the presently preferred embodiments, appended claims and accompanying drawings, in which:

DESCRIPTION OF THE ENABLING EMBODIMENT

Figure 1:
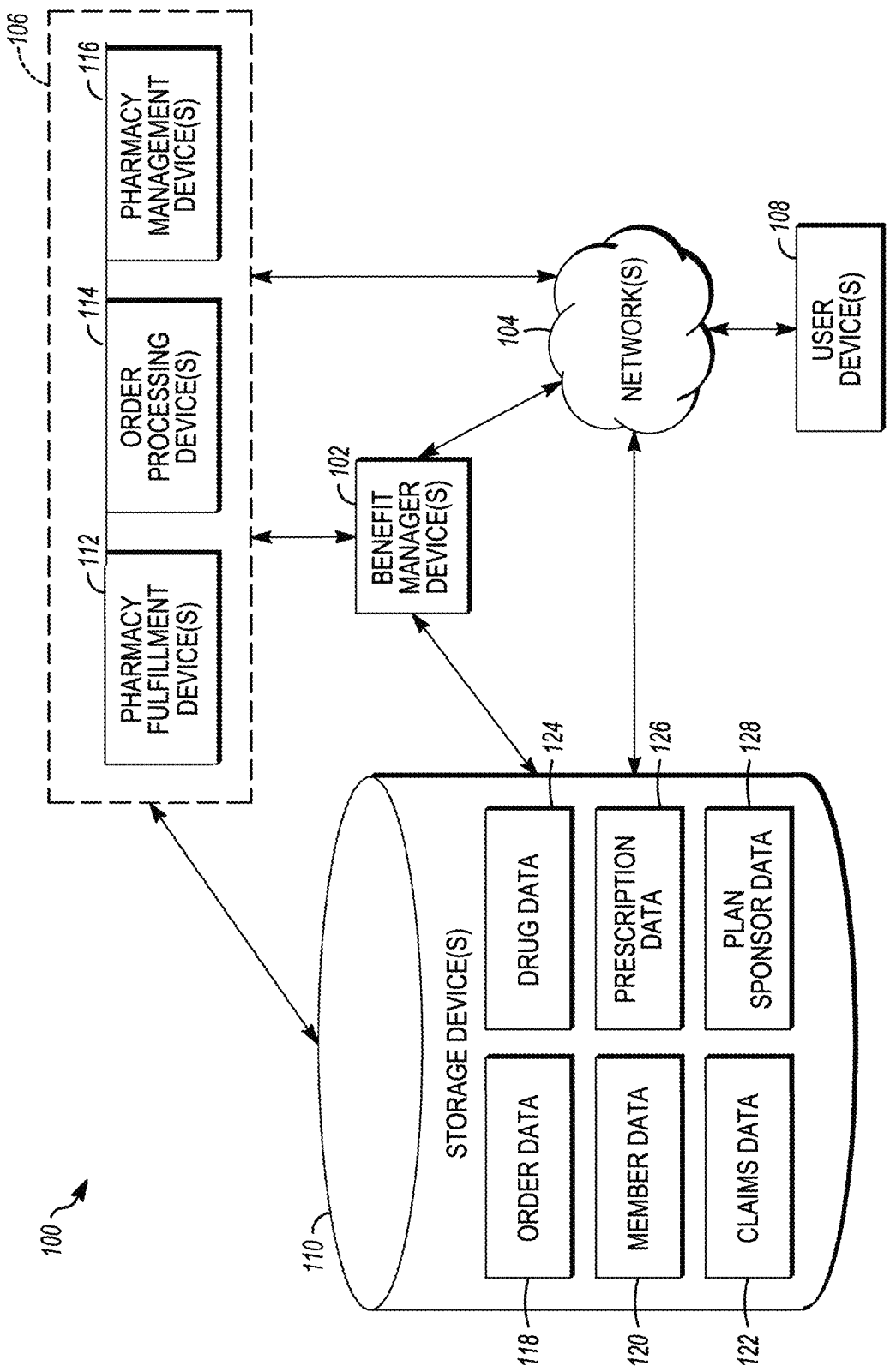
FIG. 1 is a block diagram of an example system according to an example embodiment.

FIG. 1 is a block diagram of an example implementation of a system 100, according to an example embodiment. While the system 100 is generally described as being deployed in a high volume pharmacy or fulfillment center (e.g., a mail order pharmacy, a direct delivery pharmacy, an automated pharmacy, multiple package delivering center, and the like), the system 100 and/or components thereof may otherwise be deployed (e.g., in a lower volume pharmacy or other dispenser of large numbers of small items). A high volume pharmacy may be a pharmacy that is capable of filling prescriptions automatically, mechanically, manually, or a combination thereof. The system 100 may include a benefit manager device 102, a pharmacy device 106, and a user device 108, which may communicate with each other directly and/or over a network 104. The system may also include a storage device 110. The system 100 can fill multiple orders (e.g., prescriptions), which may include multiple components (different drugs, ancillary equipment, literature, sensors, measurement devices, coolant, gel packs, and the like) into each order and then sort the multiple orders into subsets to be placed into a designated shipping container. The shipping containers may store at least one logical subset. In an example, a subset can be packages assigned to a geographic region, e.g., a delivery area assigned by the courier or cartage company who will pick up the shipping container, postal code, state, metro area and the like, or a plurality of any one of these geographically defines regions. The systems described herein tracks the type of package to be assigned to each shipping container and sorts the type of package to the assigned shipping container for that type of package. The package types can be set based on delivery provider, pick up time, geographic location, delivery type and the like. The system can use a tack, e.g., a main conveyor, to deliver finished packages to one of a plurality of configurable exit conveyors, which then deliver the finished package to the assigned one of a plurality of shipping containers addressable by the configurable conveyor. The configurable conveyor has a number of configurable states, e.g., lengths, to reach each of the shipping containers assigned to that exit location from the main conveyor.

The benefit manager 102 is a device operated by an entity that is at least partially responsible for creation and/or management of the pharmacy or drug benefit, e.g., controlling an order. While such an entity operating the benefit manager device 102 is typically a pharmacy benefit manager (PBM), other entities may operate the benefit manager device 102 either on behalf of themselves, the PBM, another entity, or other entities. For example, the benefit manager device 102 may be operated by a health plan, a retail pharmacy chain, a drug wholesaler, a data analytics or other type of software-related company, or the like. In some embodiments, a PBM that provides the pharmacy benefit may also provide one or more than one additional benefits including a medical or health benefit, a dental benefit, a vision benefit, a wellness benefit, a radiology benefit, a pet care benefit, an insurance benefit, a long term care benefit, a nursing home benefit, and the like. The PBM may, in addition to its PBM operations, operate one or more than one pharmacy.

Some of the operations of the PBM that operates the benefit manager device 102 may include the following activities and processes. A member (or a person on behalf of the member) of a pharmacy benefit plan administered by or through the PBM attempts to obtain a prescription drug at a retail pharmacy location (e.g., a location of a physical store) from a pharmacist or a pharmacist technician. The member may also attempt to obtain the prescription drug through mail order drug delivery, from a mail order pharmacy location, which may be the high volume pharmacy system 100. In some embodiments, the member may also attempt to obtain the prescription drug directly or indirectly through the use of a machine, such as a kiosk, vending unit, mobile electronic device, or a different type of mechanical electrical, electronic communication device, and/or computing device. Such a machine may be filled with the prescription drug in prescription packaging, which may include multiple prescription components, prepared by the high volume pharmacy system 100. The PBM may also set up fulfilling the prescription in a package to be assigned to a shipping container that is filled with similar packages.

The member may have a copayment for the prescription drug that reflects an amount of money that the member is responsible to pay the pharmacy for the prescription drug. The money paid by the member to the pharmacy may come from personal funds of the member, a health savings account (HSA) of the member or the member's family, a health reimbursement arrangement (HRA) of the member or the member's family, a flexible spending account (FSA) of the member or the member's family, or the like. In some instances, an employer of the member may directly or indirectly fund or reimburse the member for the copayments.

The amount of the co-pay required form the member may vary with different pharmacy benefit plans having different plan sponsors or clients and/or prescription drugs. The member's copayment may be based on a flat copayment (e.g., $10), co-insurance (e.g., 10%), and/or a deductible (e.g., for first $500 of annual prescription drug expenses) for certain prescription drugs, certain types and/or classes of prescription drugs, and/or all prescription drugs. The copayment may be stored in the storage 110 or determined by the benefit manager device 102.

In some instances, the member may not pay the copayment or may only pay a portion of the copayment for the prescription drug. For example, if the usual and customary cost for a generic version of a prescription drug is $4, and the member's flat copayment is $20 for the prescription drug, the member may only be required to pay $4 to receive the prescription drug. In another example involving a worker's compensation claim, no copayment may be due by the member for the prescription drug.

In addition, copayments may also vary based on different delivery channels used for the prescription drug to be received by the member. For example, the copayment for receiving the prescription drug from a mail order pharmacy location may be less than the copayment for receiving the prescription drug from a retail pharmacy location.

In conjunction with receiving the copayment (if any) from the member and dispensing the prescription drug to the member, the pharmacy submits a claim to the PBM for the prescription drug. After receiving the PBM (e.g., through the benefit manager device 102) may perform certain adjudication operations including verifying eligibility for the member, identifying and/or reviewing an applicable formulary for the member to determine any appropriate copayment, coinsurance, and deductible for the prescription drug, and performing a drug utilization review (DUR) on the member. The PBM provides a response to the pharmacy (e.g., from the benefit manager device 102 to the pharmacy device 106) following performance of at least some of the operations mentioned herein.

As part of the adjudication, a plan sponsor (or the PBM on behalf of the plan sponsor) ultimately reimburses the pharmacy for filling the prescription drug when the prescription drug was successfully adjudicated.

The aforementioned adjudication operations generally occur before the copayment is received and the prescription drug is dispensed. However, in some instances these operations may occur simultaneously, substantially simultaneously, or in a different order. In addition, more or less adjudication operations may be performed as at least part of the adjudication process.

The amount of reimbursement paid to the pharmacy by a plan sponsor and/or money paid by the member may be determined at least partially based on the type(s) of pharmacy network in which the pharmacy is included. Other factors may also be used to determine the amount in addition to the type of pharmacy network. For example, if the member pays the pharmacy for the prescription drug without the prescription drug benefit provided by the PBM (e.g., by paying cash without use of the prescription drug benefit or by use of a so-called pharmacy discount card offering other negotiated rates), the amount of money paid by the member may be different than when the member uses prescription or drug benefit. In some embodiments, the amount of money received by the pharmacy for dispensing the prescription drug and for the prescription drug itself may be higher than when the member uses the prescription or drug benefit. Some or all of the foregoing operations may be performed by executing instructions stored on the benefit manager device 102 and/or an additional device.

Examples of the network 104 include Mobile Communications (GSM) network, a code division multiple access (CDMA) network, a $3^{rd}$ Generation Partnership Project (3GPP) network, an Internet Protocol (IP) network, a Wireless Application Protocol (WAP) network, a WiFi network, or an IEEE 802.11 standards network, as well as various combinations thereof. The network 104 may include an optical communication network. The network 104 may be a local area network or a global communication network, such as the Internet. In some embodiments, the network 104 may include a network dedicated to prescription orders, e.g., a prescribing network such as the electronic prescribing network operated by Surescripts of Arlington, Virginia or by Express Scripts, Inc. of St. Louis, MO.

Moreover, although the system shows a single network 104, multiple networks can be used. The multiple networks may communicate in series with each other to link the devices 102, 106-110 or in parallel to link the devices 102, 106-110.

The pharmacy device 106 may include an order processing device 114, a pharmacy manager device 116, and a pharmacy fulfillment device 112 in communication with each other directly and/or over the network 104.

The order processing device 114 may receive information regarding filling prescriptions and may direct an order component to one or more than one of the devices of the pharmacy fulfillment device 112 at a pharmacy. The pharmacy fulfillment device 112 may fulfill, dispense, aggregate, and/or pack the order components of the prescription drugs in accordance with one or more than one of the prescription orders directed by the order processing device 114. The order processing device 114 may be deployed in the system 100, or may otherwise be used. The order processing device 114 can include circuitry to assign an order to be filled to a specific shipping container and may schedule the order of the filling of the order based on the positioning of the configurable conveyors. The system 100 then need only reconfigure the configurable conveyors at limited set times during a day. In an example embodiment, the order processing device 114 can set the position of the configurable conveyors to sort the filled order packages into the assigned shipping container at the start of the sortation process or the order filling process. In another example embodiment, the order processing device 114 can control the configurable conveyors in real-time such that the conveyor is in the correct position to place the completed order package in the assigned shipping container from the plurality of shipping containers associated with the exit location of a main conveyor and served by one of the configurable exit conveyors. The pharmacy fulfillment device 112 may include an item dispenser that includes a door that stages a group of items (e.g., medications, small solids, individual units or the like) for dispensing into appropriate product containers. The product containers can be tracked in the pharmacy fulfillment device 112 and/or the order processing device 114.

In general, the order processing device 114 is a device located within or otherwise associated with the pharmacy to enable fulfillment of a prescription and dispensing prescription drugs by the pharmacy fulfilment device 112. In some embodiments, the order processing device 114 may be an external device separate from the pharmacy and communicate with other devices located within the pharmacy.

For example, the external order processing device 114 may communicate with an internal order processing device 114 and/or other devices located within the system 100. In some embodiments, the external order processing device 114 may have limited functionality (e.g., as operated by a patient requesting fulfillment of a prescription drug), while the internal pharmacy order processing device 114 may have greater functionality (e.g., as operated by a pharmacist). The internal order processing device 114 can control the position of the conveyors.

The order processing device 114 may track the prescription order as it is fulfilled by the pharmacy fulfillment device 112. The prescription order may include one or more than one prescription drugs to be filled by the pharmacy. The order processing device 114 may make pharmacy routing decisions and/or order consolidation decisions for the particular prescription order. The pharmacy routing decisions may include what device(s) in the pharmacy are responsible for filling or otherwise handling certain portions of the prescription order. The order consolidation decisions include whether portions of one prescription order or multiple prescription orders should be shipped together for a patient or a patient family. The order processing device 114 may also track and/or schedule literature or paperwork associated with each prescription order or multiple prescription orders that are being shipped together. The order processing device 114 can inform the pharmacy fulfilment device 112 when the order is packaged, e.g., completed, sealed in a package and correctly labeled for delivery, e.g., by a courier, a cartage, mail service, package delivery and the like (e.g., completes a manifest process). The pharmacy fulfilment device 112 can then control the conveyor system to place the completed package in the assigned shipping container. In an example embodiment, the order processing device 114 can receive the configuration of the conveyor system from the pharmacy fulfilment device 112 and track the completed package to the assigned bulk shipping container.

The pharmacy management device 116 may enable and/or facilitate management and operations in a pharmacy. For example, the pharmacy management device 116 may provide functionality to enable receipt and processing of prescription drug claims, management of pharmacy personnel, management of pharmaceutical and non-pharmaceutical products, track products in the pharmacy, record workplace incidents involve personnel and products, and the like. In some embodiments, the order processing device 114 may operate in combination with the pharmacy management device 116. The pharmacy management device 116 can track the shipping container and the packages in the shipping container as the shipping container leaves the pharmacy 100.

In some embodiments, the pharmacy management device 116 may be a device associated with a retail pharmacy location (e.g., exclusive pharmacy location, a grocery store with a retail pharmacy, or a general sales store with a retail pharmacy) or other type of pharmacy location at which a member attempts to obtain a prescription. The pharmacy management device 116 may be utilized by the pharmacy to submit the claim to the PBM (e.g., through the benefit management device 102) for adjudication.

In some embodiments, the pharmacy management device 116 may enable information exchange between the pharmacy and the PBM, for example, to allow the sharing of member information such as drug history, and the like, that may allow the pharmacy to better service a member (e.g., by providing more informed therapy consultation and drug interaction information, etc.). In some embodiments, the benefit manager 102 may track prescription drug fulfillment and/or other information for patients that are not members or have not identified themselves as members, at the time (or in conjunction with the time) in which they seek to have a prescription filled at a pharmacy. The pharmacy management device 116 can track the shipping information and interact with the third party delivery service (e.g., carrier, courier or local delivery service or the like) to provide data to create a manifest for each package.

The pharmacy fulfillment devices 112, the order processing device 114, and/or the pharmacy management device 116 may include circuitry, a processor, a memory to store data and instructions, and communication functionality. These devices 112-116, in some embodiments are dedicated to performing processes, methods and/or instructions described herein. Other types of electronic devices specifically configured to implement with the processes, methods and/or instructions described herein may also be used.

In some embodiments, at least some functionality of the order processing device 114 may be included in the pharmacy management device 116 may include circuitry, a processor, a memory to store data and instructions, and communication functionality. These devices 112-116, in some embodiments, are dedicated to performing processes, methods and/or instructions described herein. Other types of electronic devices specifically configured to implement with the processes, methods and/or instructions described herein may also be used.

In some embodiments, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (e.g., by utilizing a local storage) and/or through the network 104 (e.g., by utilizing a cloud configuration or software as a service, etc.) with the storage 110.

The user device 108 is used by a device operator. The device operator may be a user (e.g., an employee, a contractor, a benefit member, a patient of the pharmacy, or the like) associated with the system 100. Other device operators may also operate the user device 108. In some embodiments, the user device 108 may enable the device operator to attend to pharmacy operations in a convenient manner (e.g., remote from a pharmacy). In some embodiments, the user device 108 may enable the device operator to receive information about pharmacy processes, prescription drug fulfillment status, and the like.

The user device 108 may be a stand-alone device that solely provides at least some of the functionality of the methods and systems, or may be a multi-use device that has functionality outside off analysis of the methods and systems. In some embodiments, the computing system may include a mobile computing device. For example, the user device 108 may include a mobile electronic device, such as an iPhone or iPad by Apple, Inc., and mobile electronic devices powered by Android by Google, Inc. The user device 108 may also include other computing devices, such as desktop computing devices, notebook computing devices, netbook computing devices, gaming devices, and the like. Other types of electronic devices may also be used. The user device 108 running an application becomes a dedicated device when executing the application.

The storage device 110 may include: a non-transitory storage (e.g., memory, hard disk, CD-ROM, and the like) in communication with the benefit manager device 102, the pharmacy device 106, and/or the user device 108 directly and/or over the network 104. The non-transitory storage may store order data 118, member 120, claims data 122, drug data 124, prescription data 126, and/or plan sponsor 128. Further, the system 100 may include additional devices, which may communicate with each other directly or over the network 104.

The order data 118 may be related to a prescription order. The order data may include the type of the prescription drug (e.g., drug name and strength) and quantity of the prescription drug. The order data 118 may also include data used for completion of the prescription, such as prescription materials and/or the type and/or size of container in which the drug is dispensed or in which is requested to be dispensed. In general, prescription materials include an electronic copy of information regarding the prescription drug for inclusion with or otherwise provided (e.g., via email) in conjunction with the fulfilled prescription. The prescription materials may include electronic information regarding drug interaction warnings, recommended usage possible side effects, expiration date, date of prescribing, or the like. The order data 118 may be used by the pharmacy to fulfill a pharmacy order.

In some embodiments, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (e.g., a prescription bottle and sealing lid, prescription packaging, and the like) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information, such as bar code data read from pallets, bins, trays, carts, and the like used to facilitate transportation of prescriptions within the pharmacy may also be stored as order data 118.

The member data 120 includes information regarding the members associated with the PBM. The information stored as member data 120 may include personal information, personal health information, protected health information, fitness data, health data, web and mobile app activity, and the like. Examples of the member data 120 include name, address, telephone number, e-mail address, prescription drug history, and the like. The member data 120 may include a plan sponsor identifier that identifies the plan sponsor associated with the member and/or a member identifier that identifies the member to the plan sponsor. The member data 120 may also include, by way of example, dispensation preferences such as type of label, type of cap, message preferences, language preferences, or the like.

The member data 120 may be accessed by various devices in the pharmacy to obtain information utilized for fulfillment and shipping of prescription orders. In some embodiments, an external order processing device 114 operated by or on behalf of a member may have access to at least a portion of the member data 120 for review, verification, or other purposes.

In some embodiments, the member data 120 may include information for persons who are patients of the pharmacy but are not members in a pharmacy benefit plan being provided by the PBM. For example, these patients may obtain drugs directly from the pharmacy, through a private label service offered by the pharmacy, or otherwise. In general, the use of the terms member (e.g., of a prescription drug benefit plan) and patient (e.g., of a pharmacy) may be used interchangeably in this disclosure.

The claims data 122 includes information regarding pharmacy claims adjusted by the PBM under a drug benefit program provided by the PBM for one, or more than one, plan sponsor. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number), the dispensing date, generic indicator, GPI number, medication class, the cost of the prescription drug provided under the drug benefit program, the copay/coinsurance amount, rebate information, and/or member eligibility, and the like. Additional information may be included.

In some embodiments, other types of claims beyond prescription drug claims may be stored in the claims data 122. For example, medical claims, dental claims, wellness claims, or other types of health care-related claims for members may be stored as a portion of the claims data.

In some embodiments, the claims data 122 includes claims that identify the members with whom the claims are associated. In some embodiments, the claims data 122 includes claims that have been de-identified (e.g., associated with a unique identifier but not with a particular, identifiable member), aggregated, and/or otherwise processed.

The drug data 124 may include drug name (e.g., technical name and/or common name), other names by which the drug is known by, active ingredients, an image of the drug (e.g., in pill form), and the like. The drug data 124 may include information associated with a single medication or multiple medications.

The prescription data 126 may include information regarding prescriptions that may be issued by prescribers on behalf of patients, who may be members of the pharmacy benefit plan, for example to be filled by a pharmacy. Examples of the prescription data 126 include patient names, medication or treatment (such as lab tests), dosing information, and the like. The prescriptions may be electronic prescriptions, paper prescriptions that have been scanned, or otherwise. In some embodiments, the dosing information reflects a frequency of use (e.g., once a day, twice a day, before each meal, etc.) and a duration of use (e.g., a few days, a week, a few weeks, a month, etc.).

In some embodiments, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, and the like.

Figure 2:
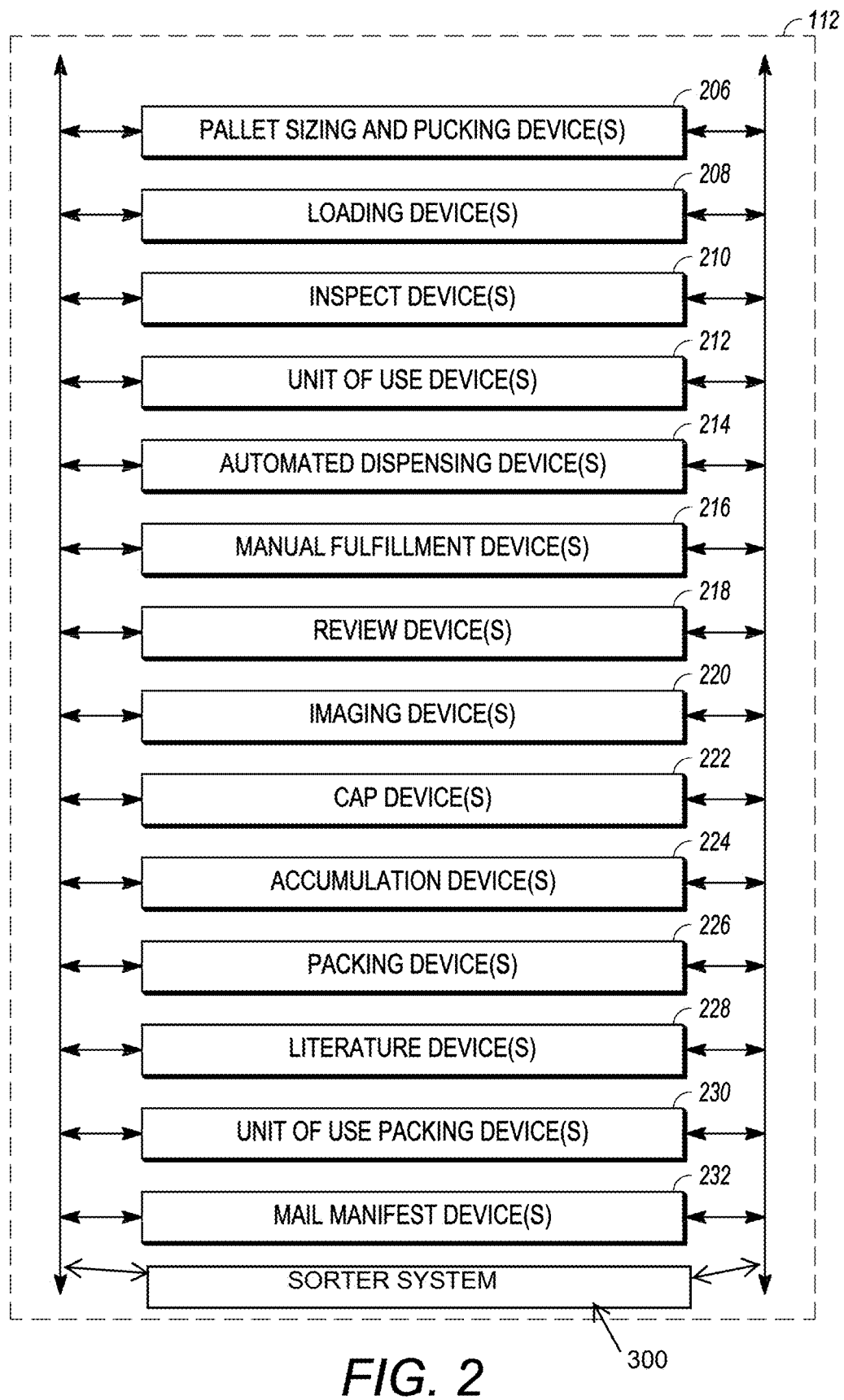
FIG. 2 is a block diagram of an example order processing device that may be deployed within the system of FIG. 1.

FIG. 2 illustrates the pharmacy fulfillment device 112, according to an example embodiment. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device, the order processing device 114, and/or the non-transitory storage 110, directly or over the network 104. Specifically, the pharmacy fulfillment device 112 may include pallet sizing and pucking device(s) 206; loading device(s) 208; inspect device(s) 210, unit of use device(s) 212, automated dispensing device(s) 214, manual fulfillment device(s) 216, review device(s) 218, imaging device(s) 220, cap device(s) 222, accumulation device(s) 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some embodiments, operations performed by one or more of these devices 206-232 may be performed sequentially, or in parallel with the operations of devices as may be coordinated by the order processing device 114. In some embodiments, the order processing device 114 tracks a prescription with the pharmacy based on operations performed by one or more than one of the devices 206-232.

In some embodiments, the pharmacy fulfillment device 112 may transport prescription drug containers, for example, between more than one of the devices 206-230 in a high volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism, or the like. In one embodiment, the loading device 208 has robotic arms or pickers to grasp a prescription container and move it to and from a pallet or to and from a puck. The loading device may also print a label that is appropriate for a container that is to be loaded onto the pallet and apply the label to the container. The pallet may be located on a conveyor assembly during these operations (e.g., at the high volume fulfillment center or the like).

The inspect device 210 may verify that containers in a pallet are correctly labeled and in the correct spot on the pallet. The inspect device 210 may scan the label on one or more than one container on the pallet. Labels of containers may be scanned or imaged in full or in part by the inspect device 210. Such imaging may occur after the container has been lifted out of its puck by a robotic arm, picker, or the like, or may be otherwise scanned or imaged while retained in the puck. In some embodiments, images and/or video captured by the inspect device may be stored in the storage device as a portion of the order data 118.

The unit of use device 212 may temporarily store, monitor, label, and/or dispense unit of use products. In general, unit of use products are prescription drug products that may be delivered to a patient or member without being repackaged at the pharmacy. These products may include pills in a container, pills in a blister pack, inhalers, liquids in a spray or other dispensing container, and the like. Prescription drug products dispensed by the unit of use device 212 may be packaged individually or collectively for shipping, or may be shipped in combination with other prescription drugs dispensed by other devices (e.g., in the high volume fulfillment center).

At least some of the operations of the devices 206-230 may be directed by the other processing device 114. For example, the manual fulfillment device 216, the review device 218, the automated dispensing device 214, the packing device 226, and/or another device may receive instructions provided by the order processing device.

The automated dispensing device 214 may include one or more than one device that dispenses prescription drugs or pharmaceuticals into prescription containers in accordance with one or multiple prescription orders. In general, the automated dispensing device 214 may include mechanical and electronic components with, in some embodiments, software and/or logic to facilitate pharmaceutical dispensing that would otherwise be performed in a manual fashion by a pharmacist and/or pharmacist technician. For example, the automated dispensing device 214 may include high volume fillers (HVFs) that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high volume fulfillment center. The automated dispensing device 214 may include a counter to count medications from a hopper and dispense to a specified container through a dispensing door structure to stage and to guide the drug items to the specified container.

The manual fulfillment device 216 may provide for manual fulfillment of prescriptions. For example, the manual fulfillment device 216 may receive or obtain a container and enable fulfillment of the container by a pharmacist or pharmacy technician. In some embodiments, the manual fulfillment device 216 provides the filled container to another device in the pharmacy fulfillment devices 112 to be joined with other containers in a prescription order for a patient or member. In general, a manual fulfillment may include operations at least partially performed by a pharmacist or a pharmacy technician. For example, a person may retrieve a supply of the prescribed drug, may make an observation, may count out a prescribed quantity of drugs and place them into a prescription container, or the like. Some portions of the manual fulfillment process may be automated by use of a machine. For example, counting of capsules, tablets, or pills may be at least partially automated (e.g., through use of a pill counter or the like). Prescription drugs dispensed by the manual fulfillment device 216 may be packaged individually or collectively for shipping or may be shipped in combination with other prescription drugs dispensed by other devices in the high volume fulfillment center.

The review device 218 may process prescription containers to be reviewed by a pharmacist for proper pill count, exception handling, prescription verification, and the like. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been cancelled, containers with defects, and the like. In an example embodiment, the manual review may be performed at the manual station.

The imaging device 220 may image containers prior to filling and/or after they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114, and/or stored in the storage device 110 as part of the order data 118.

The cap device 222 may be used to cap or otherwise seal a prescription container. In some embodiments, the cap device 222 may secure a prescription container with a type of cap in accordance with a patient preference (e.g., a preference regarding child resistance, a preference regarding built-in adherence functionality, or the like), a plan sponsor preference, a prescriber preference, or the like. The cap device 222 may also etch a message into the cap or otherwise associate a message into the cap, although this process may be performed by a different device in the high volume fulfillment center.

The accumulation device 224 accumulates various containers of prescription devices in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218, at the high volume fulfillment center. The accumulation device 224 may be used to group the prescription containers prior to shipment to the member or otherwise.

The literature device 228 prints, or otherwise generates, literature to include with prescription drug orders. The literature may be printed on multiple sheets of substrates, such as paper, coated paper, printable polymers, or combinations thereof. The literature printed by the literature device 228 may include information required to accompany the prescription drugs included in a prescription order, relating to prescription drugs in the order, financial information associated with the order (e.g., an invoice or an account statement, or the like).

In some embodiments, the literature device 228 folds or otherwise prepares the literature for inclusion with a prescription drug order (e.g., in a package or the like). In some embodiments, the literature device 228 that prints the literature may be separate from the literature device that prepares the literature for inclusion with a prescription order.

The packing device 226 packages a prescription order in preparation for shipping the order. The packing device 226 may box, bag, or otherwise package the fulfilled prescription order for delivery. The packing device 226 may be a wrap seal device. A wrap seal device deployed as the packing device 226 may be a wrap seal device. A wrap seal device deployed as the packing device 226 may pause before an index; during the pause, one or more bottle, envelope or literature items have been placed within a vacuum pocket of the wrap seal device. After any bottle, envelope, or literature items have been placed in the pocket, the wrap seal device may index; specifically, the vacuum pocket may move forward. In an example embodiment, the forward movement is about the length of a bag (for example, between about 16 and 20 inches).

The packing device 226 may further place inserts (e.g., literature or other papers) into the packaging received from the literature device 228 or otherwise. For example, bulk prescription orders may be shipped in a box, while other prescription orders may be shipped in a bag which may be a wrap seal bag. The box, a bag, or the wrap seal bag can be the package for an order. The package is labeled with a manifest label after the manifest procedure, which selects the delivery service based at least on the type of delivery required for the order, which may be based on type of medication, required service level by PBM requirements, availability of delivery service at final destination and the like. The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, sort by zip code, or the like). The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, sort by zip code, or the like). The packing device 226 may include ice or temperature sensitive elements for prescriptions which are to be kept within a temperature range during shipping in order to retain efficacy or otherwise. The ultimate package may then be shipped through postal mail, through a mail order delivery service that ships via ground and/or air (e.g., UPS®, FedEx®, or DHL®, or the like), through delivery service, through a local delivery service (e.g., a courier service), through a locker box at a shipping site (e.g., an Amazon® locker, library locker, a post office box, or the like) or otherwise. The package is sorted to the appropriate the shipping container.

The unit of use packing device 230 packages a unit of use prescription order in preparation for shipping the order. These can be packaged with filling prescription containers. The unit of use packages can be packages as described herein.

The pharmacy fulfillment device 112 in FIG. 2 may include single devices 206-232 or multiple devices 206-232 (e.g., depending upon implementation in a pharmacy). The devices 206-232 may be the same type or model of device or may be different device types or models. When multiple devices are present, the multiple devices may be of the same device type or models or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or a set of adjoining buildings. The devices 206-232 may be interconnected (e.g., by conveyors), networked, and/or otherwise in contact with one another or integrated with one another (e.g., at the high volume fulfillment center). In addition, the functionality of a device may be split among a number of discrete devices and/or combined with other devices.

Figure 3:
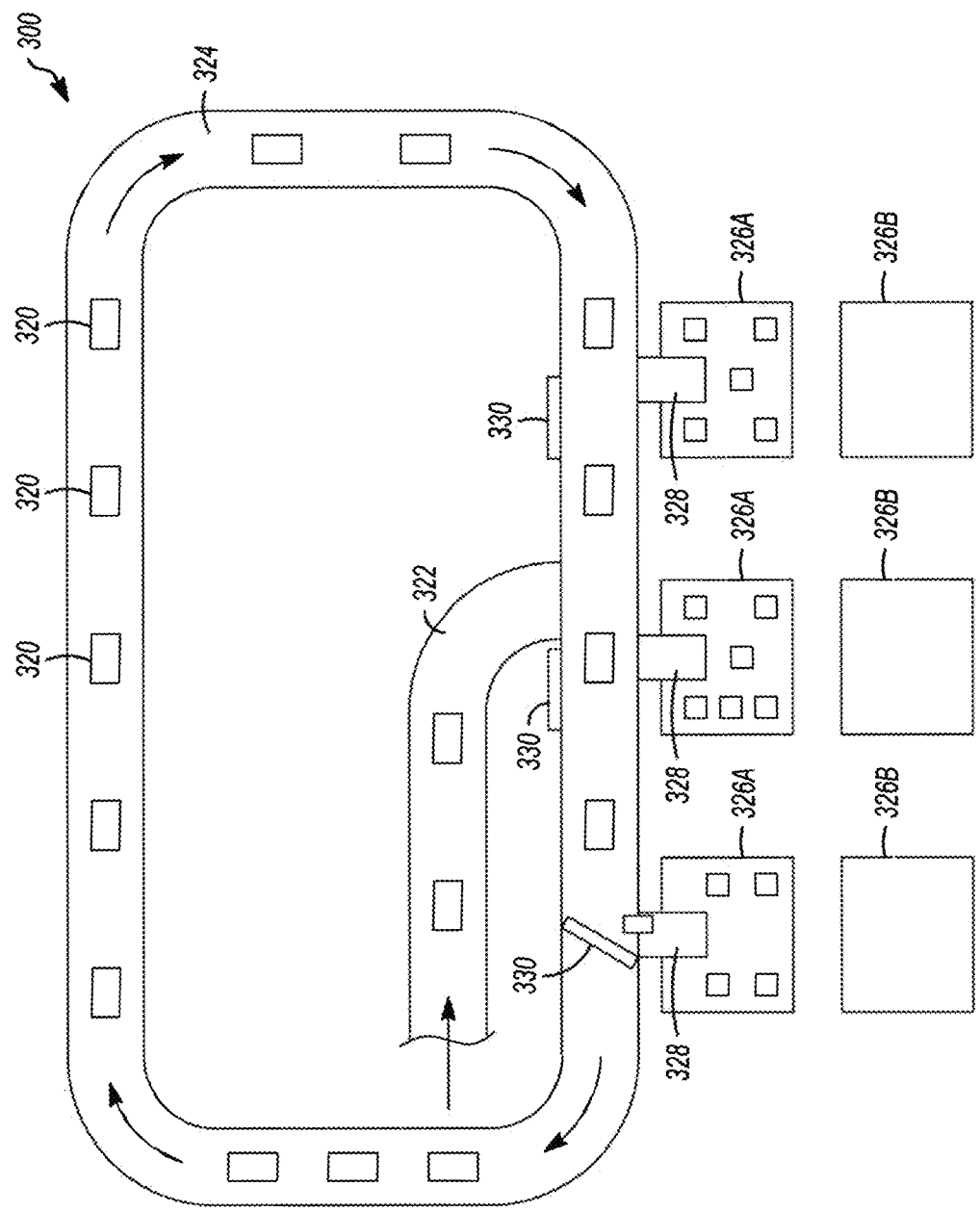
FIG. 3 is a top elevation view of a shipping area of the example order processing device and showing a plurality of conveyors in retracted conditions.

Referring now to FIG. 3, once labeled and sealed, the packages 320 from the packing device 226 and the unit of use packing device 230 are guided to a shipping system that includes a sortation device 300. Specifically, the packages 320 are guided down a ramp 322 and onto a track 324 that extends through a closed loop shape. In operation, the packages 320 are propelled around the track 324 and are ultimately deposited into the appropriate bulk shipping containers 326a, 326b associated with their destinations by a plurality of conveyors 328. The track 324 may include a driven belt; a plurality of driven rollers; a combination of driven belts on straight sections and driven rollers in corners; or any suitable means that can urge the packages 320 around the closed loop. Depositing can be performed by bomb bay style doors in the track 324 to drop the package on the assigned conveyor 328 to deliver the package to the assigned one of the plurality of bulk shipping containers. A push arm may push a selected package from the track to the assigned conveyor 328. The track 324 may include laterally driven wheels to move the package to the assigned conveyor 324. The action of the track can be controlled by a controller in the pharmacy device 114. The track 324 may be driven through any suitable means including, for example, one or more electric motors. In the exemplary embodiment, the bulk shipping containers 326a, 326b are gaylords, e.g., a reusable box type structure with an open top or an openable top capable of holding multiple packages. However, any suitable type of bulk shipping container 326a, 326b may be employed. The bulk shipping containers may have differing sizes from one another. For example, in one embodiment, some of the bulk shipping containers are dimensionally smaller than some other bulk shipping containers for receiving packages 230 intended for same-day delivery to a single destination, e.g., by a local courier service.

The bulk shipping containers 326a, 326b are located adjacent the track 324 and are arranged in a plurality of rows with a plurality of containers, here shown as two, in each row including a first bulk shipping container 326a positioned nearest the track 324 and a second bulk shipping container 326b positioned on an opposite side of the track 324 from the first bulk shipping container 326a. In the exemplary embodiment, the rows of bulk shipping containers 326a, 326b are associated with different destinations. For example, one row of bulk shipping containers 326a, 326b might be for all packages 320 with New York destinations and an adjacent row of bulk shipping containers 326a, 326b might be for all packages 320 with California destinations. In some embodiments, one or more of the rows of bulk shipping containers 326a, 326b are associated with airports for air delivery to different cities or zip codes. In some embodiments, more than one row of bulk shipping containers 326a, 326b may be associated with the same destination, e.g., a destination with a very high volume. In some embodiments, the bulk shipping containers 326a, 326b within one or more of the rows may be associated with different destinations. The exemplary embodiment includes three rows of bulk shipping containers 326a, 326b. However, other embodiments include two or four or more rows of bulk shipping containers 326a, 326b. Some embodiments also include more than two bulk shipping containers 326a, 326b in each row. In an example, the shipping containers 326a, 326b in a single row can be assigned to different delivery locations or delivery services.

In the exemplary embodiment, the first bulk shipping containers 326a of all of the rows are associated with a first delivery services company (for example, the FedEx Corporation®), and the second bulk shipping containers 326b of all of the rows are associated with a second delivery company (for example, the United Parcel Service® that has a different pickup time than the first delivery services company. For example, the first delivery service company may pick up the first bulk shipping containers 326a daily at a first set time, e.g., three pm, and the second delivery services company may pick up the second bulk shipping containers 326b daily at a second set time, e.g., six pm.

Figure 4:
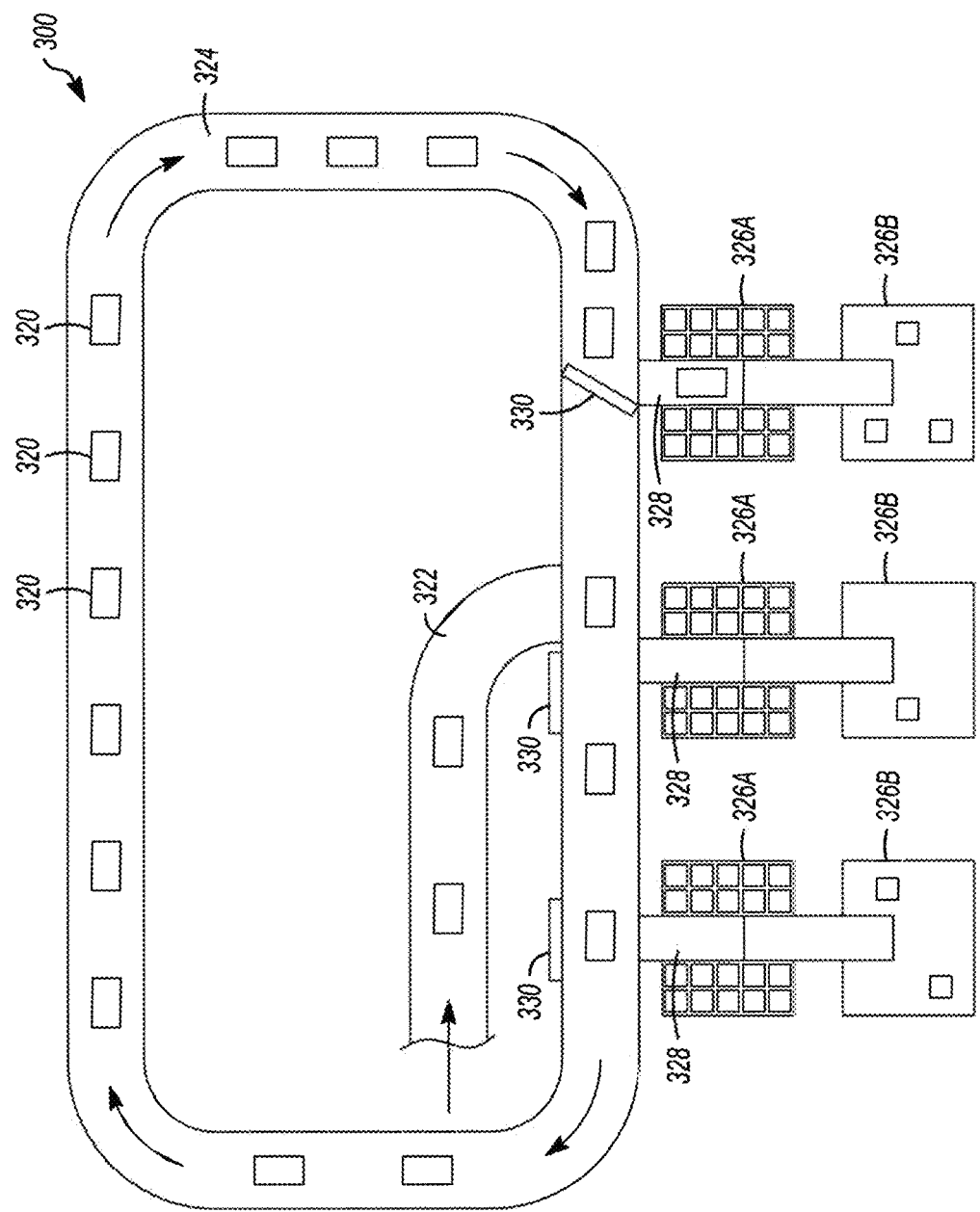
FIG. 4 is another top elevation view of the shipping area and showing the plurality of conveyors in extended conditions.

As discussed in further detail below, the conveyors 328 are configured to extend and retract to selectively choose which of the first and second bulk shipping containers 326a, 326b the packages 320 are dropped into during operation of the sortation device. Thus, prior to the pickup time of the first delivery service companies (e.g., three pm), all of the conveyors 328 can be simultaneously or individually adjusted from the retracted configurations shown in FIG. 3 for dropping the packages 320 into the first bulk shipping containers 326a to the extended configurations shown in FIG. 4 for dropping the packages 320 into the second bulk shipping containers 326b. Then, after the conveyors 328 have been extended, the first bulk shipping containers 326a can be removed and replaced with empty first bulk shipping containers 326a with no downtime in the sortation device. The conveyors 328 can then be retracted back into the retracted configurations shortly before the pickup time of the second delivery services company. Each bulk shipping container 326a, 326b can be assigned to one shipper and including only a single type of package within that container, e.g., distribution hub, delivery area, delivery time, delivery time, type of item within the package and the like. These can be triggers stored in a field in a record (e.g., in pharmacy devices 112, 114 116 or the database) associated with the package as it travels through the system 100. The system 100 can sort packages based on the field in the record. The system 100 can configure the sortation device 300 based on the orders in the packages 320 so that the packages 320 are sorted to their assigned bulk shipping containers 326a, 326b.

In some embodiments, at least one of the conveyors may be aligned with three or more bulk shipping containers. The conveyors are provided with sensors that allow the conveyor to extend and retract to certain lengths, thereby establishing multiple drop points into the different bulk shipping containers. The signal received from the controller can move the conveyors to the position for the next package to be sorted to a shipping container assigned to the conveyor.

Figure 7:
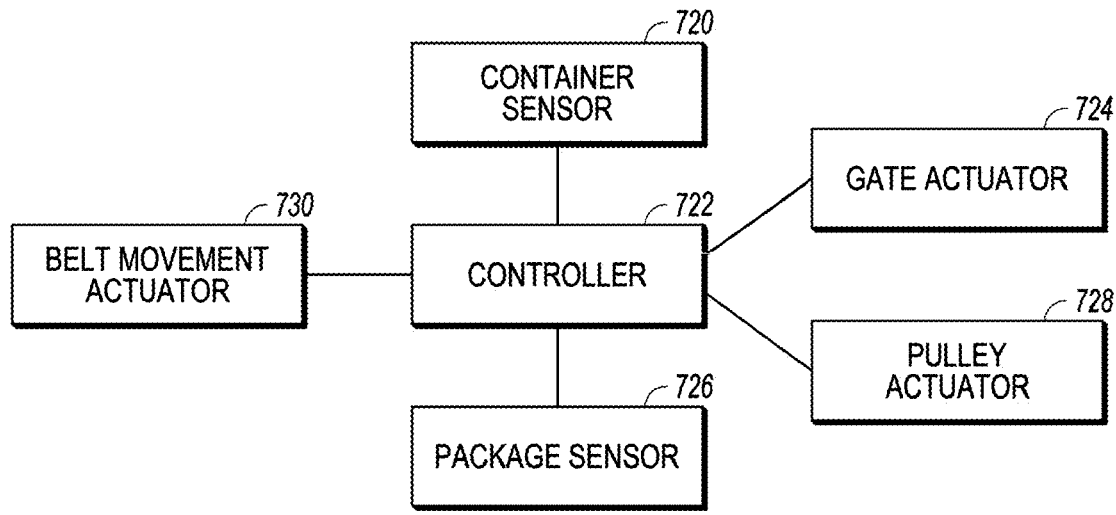
FIG. 7 is a block diagram illustrating some of the electrical components of the shipping area.

In some embodiments, other triggers could dictate the extension and retraction of the conveyors 328. For example, the conveyors 328 could be configured to extend and retract individually, and each conveyor 328 could automatically extend in response to a detection that the first bulk shipping container 326a has been filled to a set capacity or a predetermined capacity. The detection that the capacity has been reached can be manual by an operator in the shipping area; can be automatic using one or more container sensors 720 (shown in FIG. 7); or it can be automatic by having a controller 722 (also shown in FIG. 7) monitor the number of packages 320 that are deposited into each of the bulk shipping containers 326a, 326b. The container sensors 720 may be, for example, optical, weight, radar, or any suitable type of sensor capable of determine how much a bulk shipping container 326a, 326b has been filled. The sortation device 300 can thus accommodate more bulk shipping containers 326a, 326b than other known sortation devices, which have conveyors with fixed lengths. Further, the expansion and retraction of the conveyors 328 can take place automatically and very quickly, thereby eliminating the need to temporarily halt the use of the sortation device 300 when changing bulk shipping 326a, 326b containers as is sometimes necessary in other known sortation devices.

Each conveyor 328 extends at an angle away from the track 324 and towards a respective one of the rows of bulk shipping containers 326a, 326b for delivering packages 320 on the track 324 into the appropriate bulk shipping containers 326a, 326b. In the exemplary embodiment, a plurality of gates 330 are hingedly attached with the track 324 adjacent the conveyors 328 for automatically redirecting packages from the track 324 onto the appropriate conveyors 328 for delivery into the appropriate bulk shipping containers 326a, 326b. In operation, when a package 230 approaches the conveyor 328 associated with the row of bulk shipping containers 326a, 326b associated with the package's 320 destination, the controller 722 automatically activates a gate actuator 724 to move the gate 330 into a deflecting position so that the package 320 is redirected from the track 324 onto the conveyor 328. One of the gates 330 is shown in the deflecting position in FIG. 3, and a different gate 330 is shown in the deflecting position in FIG. 4. In one embodiment, the controller 722 may determine which gate 330 to activate and when to activate that gate 330 by communicating with one or more package sensors 726 positioned along the track 324. In operation, the package sensors 726 read codes on the packages 320 to determine where each package 320 is along the track 324. In various embodiments, the package sensors 726 are any combination of radio frequency identification (RFID) scanners, bar code scanners, quick response (QR) code scanners, etc. In some embodiments, other redirecting means may be employed to redirect the packages 320 from the track 324 onto the conveyors 328. For example, the redirecting means could include a blast of air or directional slates or rollers. In another example embodiment, the main track 324 may include a plurality of bomb bay doors that open downwardly to drop the packages onto the conveyors 328.

The controller 722 provides an instruction to move the at least one conveyor between the first condition and the second condition based on a trigger. The trigger can be a signal from the control circuitry of the order processing device 114 or the pharmacy fulfillment device 112. Either the order processing device 114 or the pharmacy fulfillment device 112 determines an order that the packages are being filled and determines the configuration of the conveyor system such that it will sort the packages to the assigned shipping container. For example, the order processing device 114 may order the packages such that packages that are going to a similar location, region, zip code, etc. are filled and packaged together.

Figure 5:
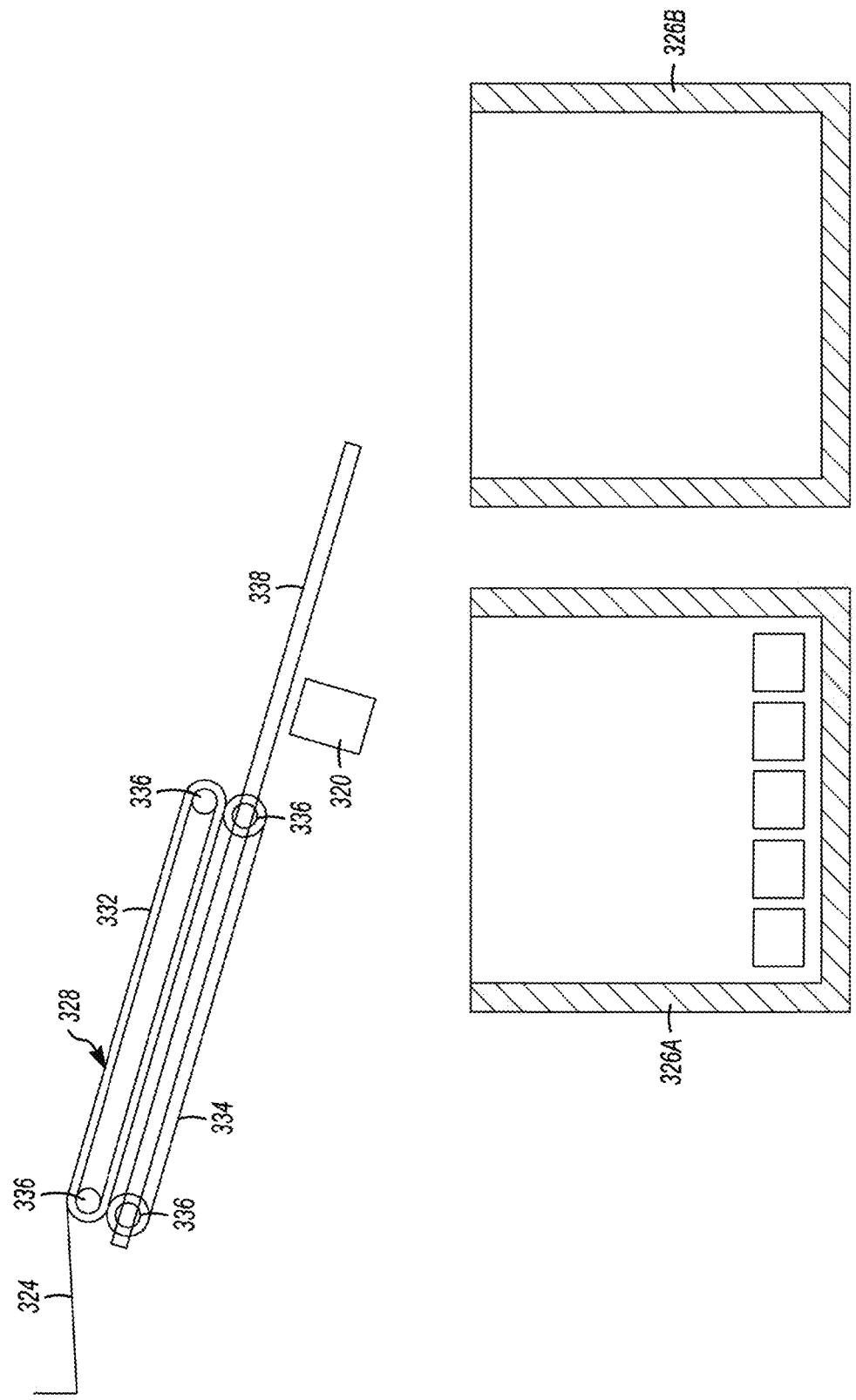
FIG. 5 is a partially cross-sectional view illustrating one of the conveyors in operation and in the retracted condition.
Figure 6:
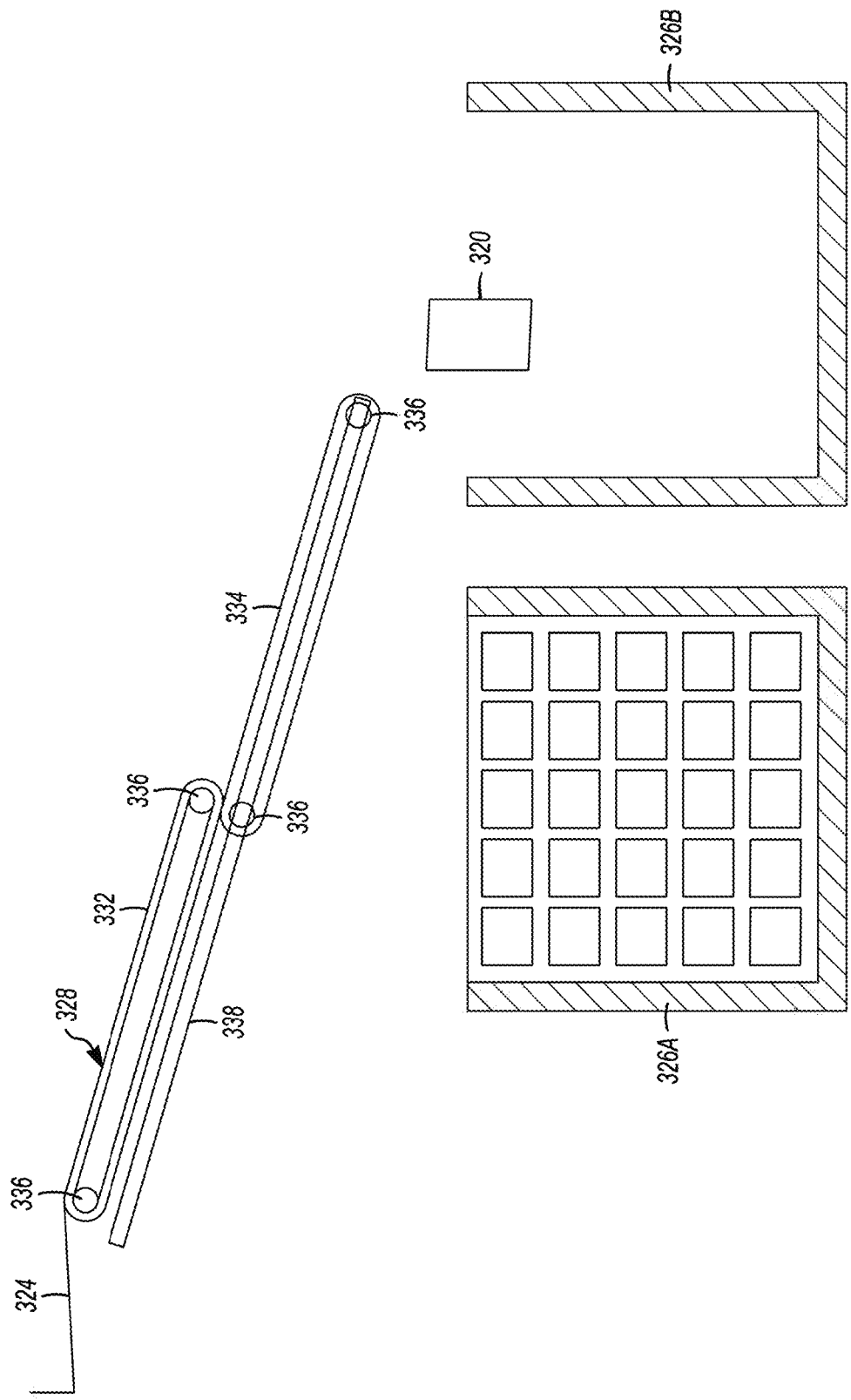
FIG. 6 is another partially cross-sectional view illustrating one of the conveyors in operation and in the extended condition.

In the exemplary embodiment, to extend and to contract, each distribution end conveyor 328 includes two belts structures 332, 334, namely an upper belt structure 332 and a lower belt structure 334 with the upper belt structure 332 being fixed and the lower belt structure 334 being moveable. The belt structures 332, 334 are supported by rollers mounted in a frame and are individual and individually driven by a prime mover, e.g., an electric motor. More specifically, the upper belt structure 332 is held in a fixed location or position. The lower belt structure 334 can move between a first position (shown in FIG. 5) and a second position (shown in FIG. 6). When the lower belt structure 334 is in the first position (also known as a retracted position), the packages 320 do not touch the lower belt 334 but instead fall directly from the upper belt structure 332 into the first bulk shipping container 326a. When the lower belt structure 334 is in the second, extended position the lower belt structure 334 extends over the first bulk shipping container 326a such that, in operation, packages 320 are prevented from falling into the first bulk shipping container 326a and instead fall from the upper belt structure 332 onto the lower belt structure 334. The lower belt structure 334 then deposits the packages 320 into the second bulk shipping container 326b. Both of the upper and lower belts structure 332, 334 can be angled downwardly from the track 324 (e.g., a main distribution conveyor) towards the first and second bulk shipping containers 326a, 326b. In some embodiments, at least one of the conveyors includes a third belt structure that leads to a separate drop point. The additional drop point could be associated with, for example, one or more strategic target locations. In still other embodiments, at least one of the conveyors lacks a belt but instead includes a low friction surface that allows the packages 320 to slide along the upper and lower structures from the track 324 to the bulk shipping containers 326a, 326b. In such embodiments, the upper and lower structures are angled at least at forty-five degrees to ensure slippage of the packages 320. In some embodiments, adjacent the bulk shipping containers 326a, 326b, the upper and lower structures (with or without belts) can take a ninety-degree turn to prevent the packages 320 from overshooting the intended bulk shipping containers 326a, 326b.

Figure 9:
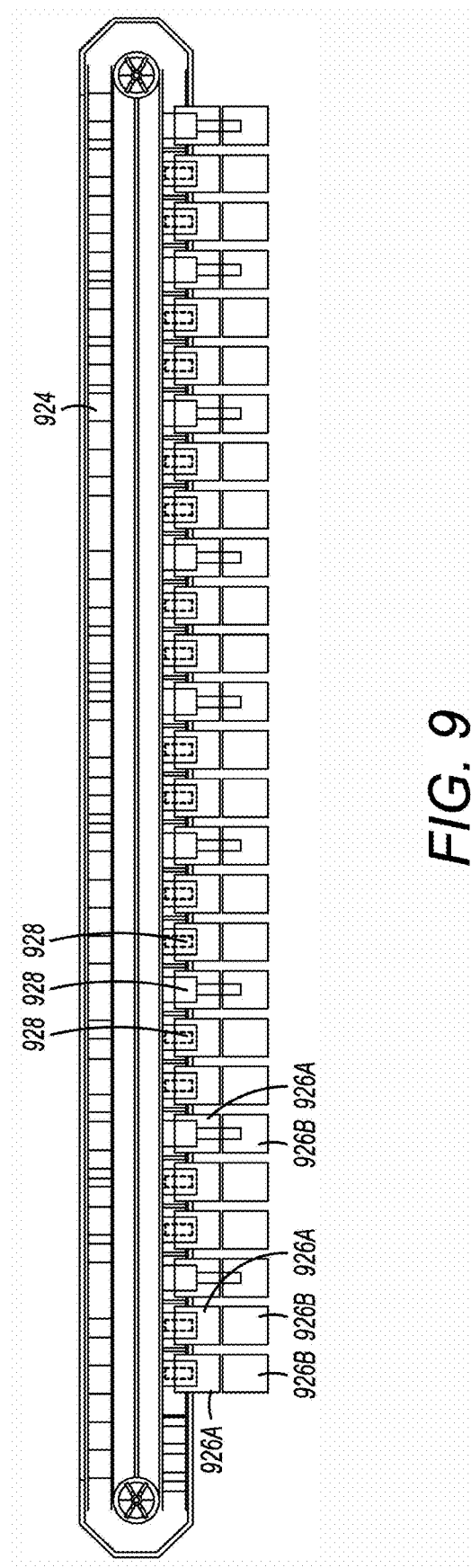
FIG. 9 is a top elevation view of another shipping area including a plurality of conveyors in extended conditions FIG. 10 a flow chart illustrating an exemplary method of operating the shipping methods and systems as described herein.

Each of the upper and lower belts structure 332, 334 includes at least two conveyor pulleys 336, and the belt 332, 334 extends through a closed loop around the pulleys 336. For each belt structure 332, 334, at least one of the conveyor pulleys 336 is driven for driving rotation of the respective belt 332, 334. One or more of the axels 336 may be undriven, and one or more of the conveyor pulleys 336 may be moveable (such as under the influence of a spring) to maintain tension in the belt 332, 334. The driven conveyor pulley(s) 336 is/are powered by a pulley actuator 728 which may be an electronic, hydraulic, or pneumatic motor in one embodiment. The upper and lower belts structures 332, 334 may have the same or different lengths. The upper and lower belts structures 332, 334 may have the same width or different widths. Referring to FIG. 9, it shows the moveable second belt structure 334 to have a narrower width than the stationary first belt structure 332. The belts on the belt structures 332, 334 have a package engaging surface with sufficient grip to move any package type (e.g., cooler, polymer bag, corrugated box and the like to the assigned shipping container).

To control the movement of the lower belt 334 between the first and second positions, the pulleys 336 of the lower belt 334 are moveable along a pair of opposing pulley tracks 338. The pulley tracks 338 are located vertically below the upper belt 332 and extend at approximately the same downward angle as both of the upper and lower belts 332, 334 in the direction towards the bulk shipping containers 326a, 326b. Both of the pulley tracks 338 extend across the full length of the first bulk shipping container 326a so that when the lower belt 334 is in the second position, the packages 320 are prevented from falling into the first bulk shipping container 326a, but the pulley tracks 338 are spaced apart so that when the lower belt 334 is in the first position, the packages 320 can fall between the pulley tracks 338 and into the first bulk shipping container 326a. The pulleys 336 are configured to move along the pulley tracks 338 in sync with one another to ensure the lower belt 324 remains tensioned as it moves between the first and second positions. In the exemplary embodiment, the pulley actuator 728, which powers the at least one driven pulley 336 of the lower belt 334, also moves with the pulleys 336. In other embodiments, the lower belt 334 moves between the first and second positions through other suitable means. As discussed above, in some embodiments, the pulley actuator 728 can be configured to stop the lower belt 334 at different locations than just the fully retracted position and the fully extended position, thereby allowing packages to be distributed into more than just two bulk shipping containers 326a, 326b or to different locations within one of the bulk shipping containers 326a, 326b.

In the exemplary embodiment, the controller 722 automatically controls the movement of the lower belt 334 between the first and second positions by activating a belt movement actuator 730 which urges the pulleys 336 of the lower belt 334 along the pulley tracks 338. In another embodiment, the lower belt 334 is manually moved between the first and second positions.

In another embodiment, each conveyor 328 only includes a single belt that can selectively extend and contract between a retracted condition for delivering packages 320 into the first bulk shipping container 326a and an extended condition for delivering packages 320 into the second bulk shipping container 326b. In yet another embodiment, each conveyor 328 includes three or more belts with one or more of the belts being moveable to control the delivery of the packages into either the first bulk shipping container 326a or the second bulk shipping container 326b.

Figure 8:
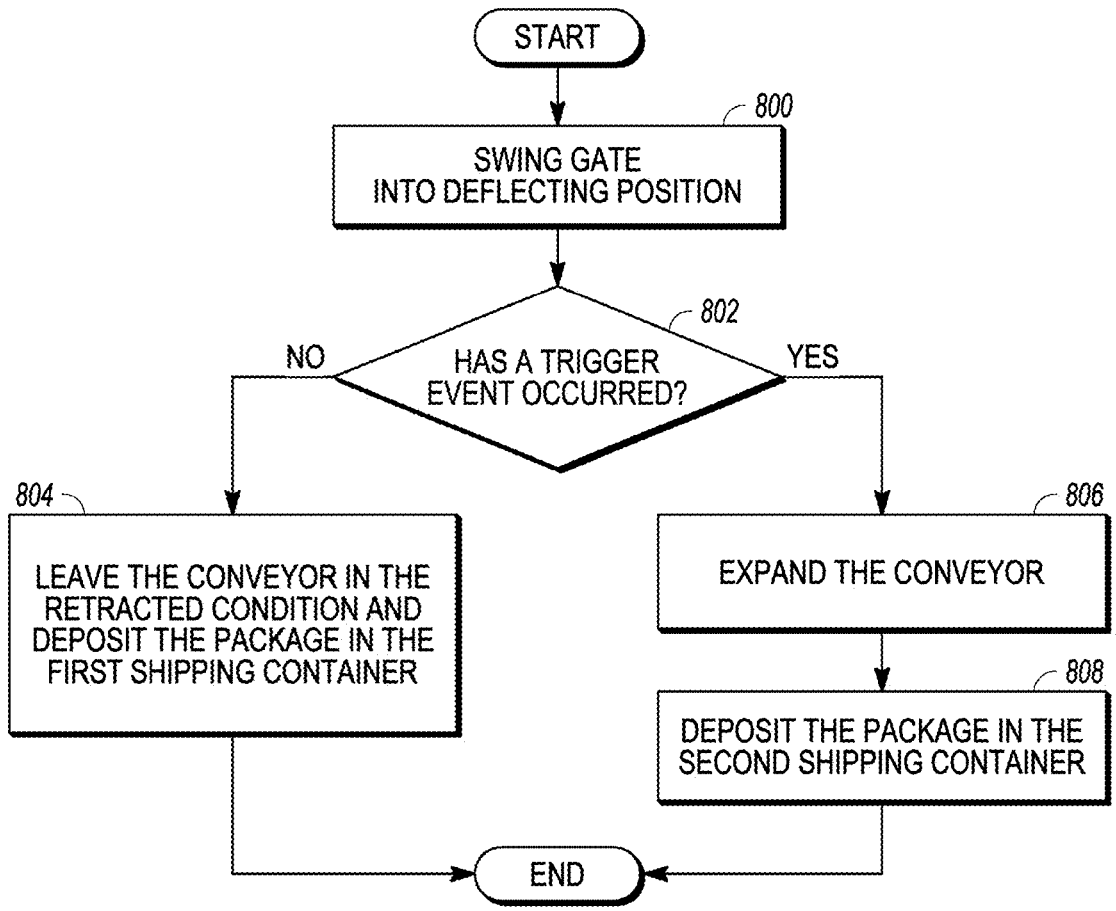
FIG. 8 is a flow chart illustrating an exemplary method of operating the shipping area shown in FIGS. 3-6.

Another aspect of the present disclosure is related to a method of distributing packages 320 into a plurality of shipping containers 326a, 326b in a shipping area, such as the shipping area shown in FIGS. 3-6 and discussed above. At step 800, the controller 722 activates one of the gate actuators 724 to swing the associated gate 330 into the deflecting position to deflect a package 320 onto the associated conveyor 328. At decision step 802, the controller 722 determines if a trigger event has occurred. In one embodiment, the trigger event is a time shortly before a first delivery service company is scheduled to pick up the first shipping containers 326a. In another embodiment, the trigger event is the controller 722 determining that one of the first shipping containers 326a has reached a predetermined capacity. If the answer at decision step 802 is no, then at step 804, the conveyor 328 remains in the retracted condition and deposits the package 320 into the first shipping container 326a. If the answer at decision step 802 is yes, then at step 806, the conveyor 328 extends and at step 808, the conveyor 328 deposits the package 320 into the second shipping container 326b. It should be appreciated that these steps can occur in a different order than what is illustrated in FIG. 8 and discussed above.

Referring now to FIG. 9, another exemplary embodiment of a shipping area is shown with like numerals, separated by a prefix of "9" indicating corresponding parts with the embodiments described above. This embodiment also includes a conveyor track 924 that extends through a closed loop for guiding packages towards respective shipping containers 926a, 926b. The conveyor track 924 tracks all packages location in the track. The conveyor track 924 can include a scanner that rescans each package as it travels around the track 924. The track 924 can also include a plurality of individual bays that receive a single package. The bays are tracked as they move around the track. In an example, the bay includes a controllable door that is normally closed to receive a package and can be selectably opened to drop the package on a conveyor 928. A plurality of conveyors 928 extend from the conveyor track 924 for delivering the packages from the conveyor track 924 to the appropriate shipping containers 926a, 926b. In this embodiment, the shipping area includes twenty-seven rows of shipping containers 926a, 926b (fifty-four shipping containers 926a, 926b in total). In this Figure, all of the conveyors 928 are shown in their respective extended configurations for delivering the packages into the second shipping containers 926b. However, as with the embodiment described above, the conveyors 928 can be individually or simultaneously adjusted between the extended and retracted configurations for selectively depositing the packages into either the first shipping containers 926a or into the second shipping containers 926b.

Figure 10:
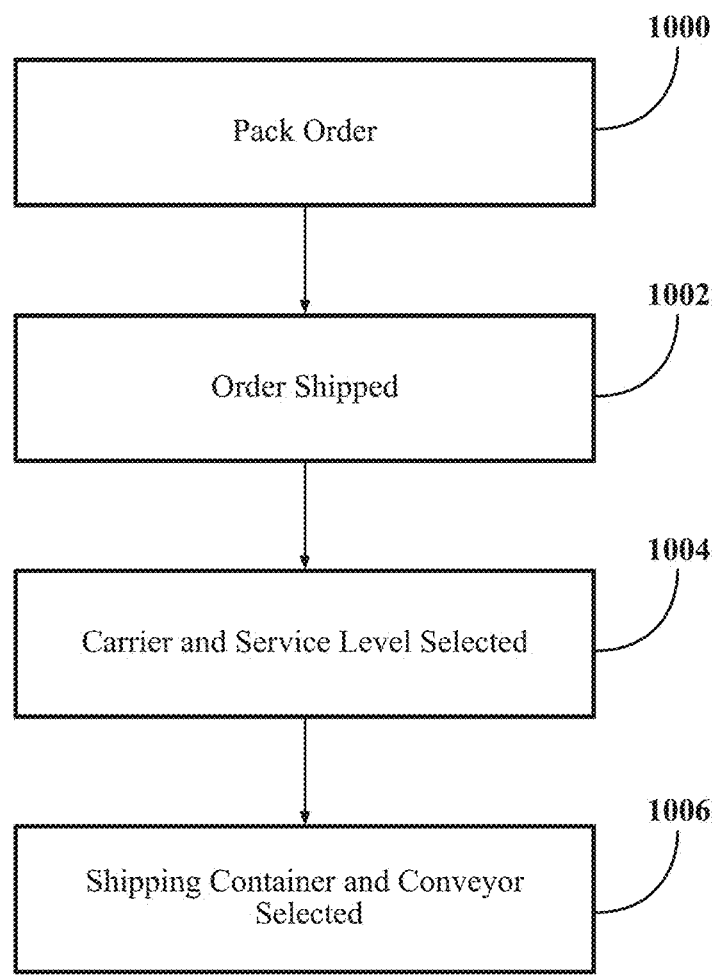

Referring now to FIG. 10, a flow chart is provided depicting the steps of preparing a package for the sortation device according to an exemplary embodiment of the present disclosure. At step 1000, the order is packed into a package. The order may include one or more prescription medications and accompanying materials, e.g., sharps accessories, different drugs, ancillary equipment, literature, sensors, measurement devices, coolant, gel packs, and the like. The package can be created by the pharmacy 106 as described herein.

At step 1002, the order is shopped to determine the most efficient delivery mode based on the type of medication and the destination. The determination may also factor in cost, reliability, and service availability in an area of the destination. The pharmacy 106 can also open the delivery assigned up to be bid on in real-time, e.g., by a local courier service such as Door Dash®, Uber®, Lyft®, or other ride share service or local package courier. The pharmacy 106 can also retrieve real-time availability of the national package delivery service.

At step 1004, a shipping carrier (such as UPS®, USPS®, FedEx®, DHL®, a local courier service, etc.) and a service level is selected based on the results of shopping at step 1002.

At step 1006, the order is manifested. This includes printing a shipping label and applying the shipping label to the package. The shipping label may include a machine-readable code, such as a bar code, alpha-numeric code, or a QR code, or any suitable device that contains order data.

At step 1008, a bulk shipping container is selected automatically by a controller (such as a programmable logic controller "PLC") based on the destination, the shipping carrier, and the service level.

At step 1010, the package is sent to the sortation system. The sortation system can sort the package to an assigned shipping container as described herein.

Figure 11:
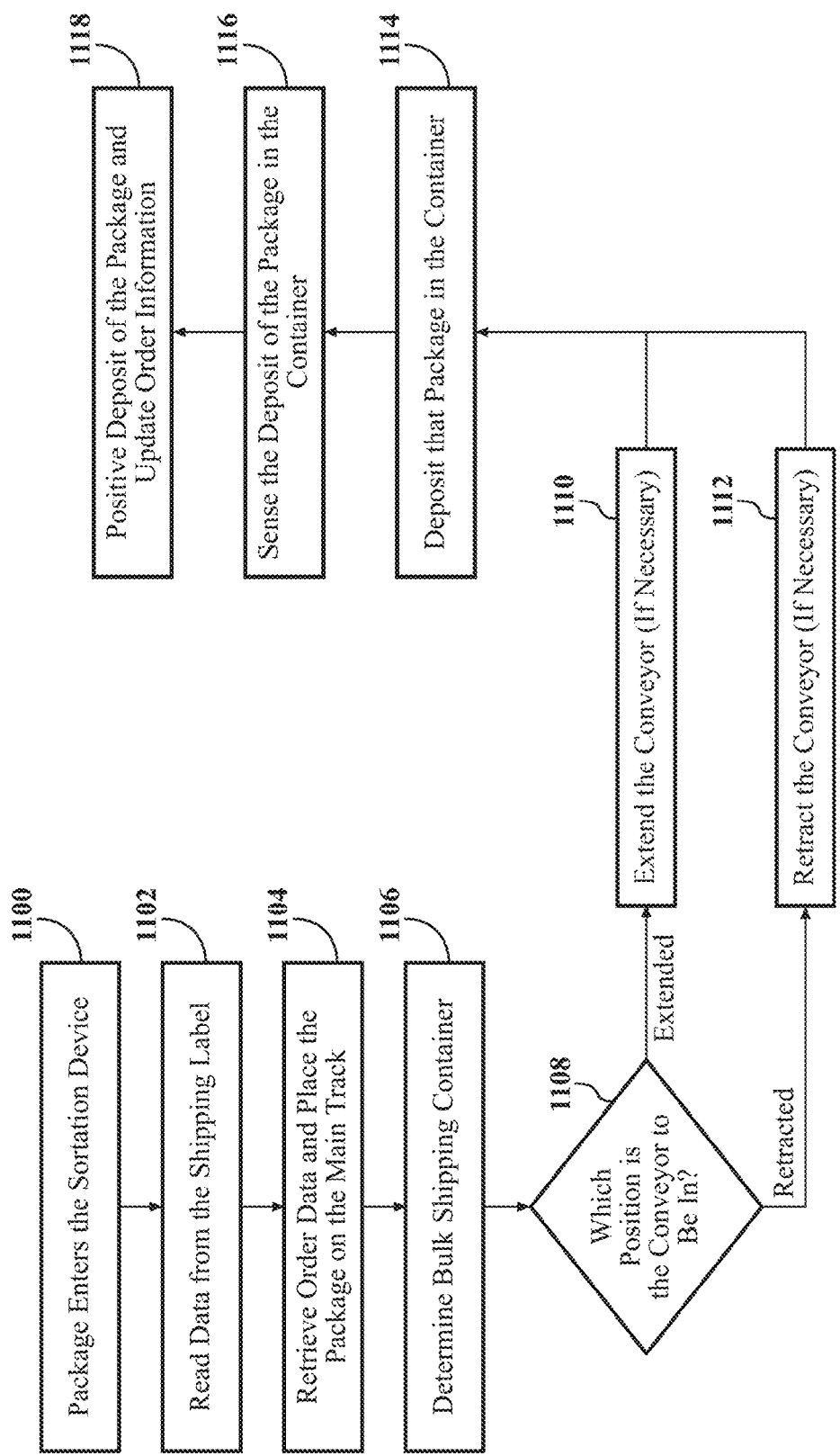
FIG. 11 is a flow chart illustrating an exemplary method of operating the shipping methods and systems as described herein.

FIG. 11 depicts a flow chart which illustrates the steps of sorting the packages and depositing the packages into the appropriate bulk shipping containers. At step 1100, the package enters the sortation device.

At step 1102, the data on the shipping label is read, such as by scanning the machine readable code.

At step 1104, the order information is retrieved by the controller and the package is placed on the main track. The order information includes at least the destination, the courier service, and the shipping level. The order information may be retrieved simultaneously or nearly simultaneously to the package being placed on the main track, where it will remain until it is ready to be deposited into one of the bulk shipping containers.

At step 1106, it is determined which bulk shipping container the package is to be deposited in. The bulk shipping container may be one of the bulk shipping containers already at the sortation device or it may be one that is going to be placed adjacent one of the conveyors after a predetermined time. Also at step 1106, it is determined which position the appropriate conveyor is to be in (e.g., retracted or extended).

At decision step 1108, it is determined which position (for example, extended or retracted) the appropriate conveyor is to be in to deposit the package in the appropriate bulk shipping container. As discussed above, in some embodiments, there may be more than two possible conveyor positions.

If the appropriate conveyor is currently in the retracted position and it is determined that the conveyor needs to be in the extended position to deposit the package into the correct bulk shipping container, then at step 1110, the conveyor is extended. As discussed above, extending the conveyor this may include moving at least one pulley of a lower belt structure along a pulley track.

If the appropriate conveyor is currently in the extended position and it is determined that the conveyor needs to be in the retracted position to deposit the package into the correct bulk shipping container, then at step 1112, the conveyor is retracted. This also may include moving at least one pulley of a lower belt structure along a pulley track.

If the conveyor is already in the appropriate condition, then steps 1110 or 1112 may be skipped.

Following step 1110 or 1112 or step 1108 (if steps 1110 and 1112 are skipped), then at step 1114, a redirecting mechanism is activated to direct the package onto the appropriate conveyor, which deposits the package into the appropriate bulk shipping container (sortation point).

At step 1116, a sensor confirms that the package has successfully been deposited into the appropriate bulk shipping container. In an example embodiment, the sensor includes at least one light emitter and at least one light detector. The light emitter may produce a curtain of light across the top of the bulk shipping container, and the light detector is configured to detect if the curtain of light is broken. In the event that a package is deposited into the bulk shipping container, the light detector detects a break in the light curtain. In other embodiments, a weight sensor or any appropriate detection mechanism may be employed.

At step 1118, a positive deposit of the package in the bulk shipping container is confirmed, and the order data is automatically updated within a database by the controller.

The present disclosure describes systems and methods for unmanned product dispensing, which can use a plurality standardized shipping containers that are each designed to receive more than one sorted products. A plurality of shipping containers are aligned from a main sortation conveyor, which includes a plurality of exits to the shipping containers. More than one shipping container may be aligned at each exit of the main sortation conveyor. At least one exit from the main sortation conveyor includes a configurable exit conveyor that has a variable length to deliver a specific package, e.g., a medical prescription to, a specific one of the plurality of shipping containers at the exit location of the main sortation conveyor. In an example embodiment, the sortation system includes the main sortation conveyor that delivers a package to a subset of shipping containers at an exit location and turns the package over to limited exit conveyor that is set to deliver the package to the assigned one shipping container of the plurality of shipping container addressable by the exit conveyor. The conveyor system automatically brings a package to the exit and sorts the package to the correct shipping container at the exit based on the status of trigger flags stored in the memory of the a controller circuitry. The controller circuitry can be part of a controller, e.g., a module for controlling distribution of the packages from the production site (e.g., a pharmacy) and monitoring status thereof, a communications module for communicating with the components, e.g., sorting gates, conveyors, readers, and the like, and, if any, sensors at the shipping containers.

Various embodiments described herein may provide an efficient item dispensing system that can be used to both deliver and dispense items into packages and sort the packages for delivery. Various embodiments allow an automated item dispensing system that can provide sorted packages to a shipper without stopping the item dispensing system. The conveyor system can be reconfigured at individual exit conveyors while other exit conveyors are still sorting packages. Various embodiments may operate an automated product dispensing system that can carry out its dispensing operation in accordance with a scheme that is pre-programmed in the system or is remotely-transmitted to the system. This can determine the sequence in which packages are prepared by an automated system and how the conveyor system is configured based on the order sequence.

Obviously, many modifications and variations of the present invention are possible in light of the above teachings and may be practiced otherwise than as specifically described while within the scope of the appended claims. Additionally, it is to be understood that all features of all claims and all embodiments can be combined with each other as long as they do not contradict each other.

What is claimed is:

1. A sortation device comprising:
a track for handling a plurality of packages;
a plurality of conveyors extending at angles away from the track towards respective sets of containers, each set of containers including at least two shipping containers;
a plurality of swing gates for redirecting the packages from the track onto the plurality of conveyors;
at least one conveyor of the plurality of conveyors being extendable from a first condition for dispensing the packages that are redirected from the track onto the at least one conveyor into a first shipping container of the at least two shipping containers in the respective set of containers and a second condition for dispensing the packages that are redirected from the track onto the at least one conveyor into a second shipping container of the at least two shipping containers in the respective set of containers;
a controller providing an instruction to move the at least one conveyor between the first condition and the second condition based on a trigger.

2. The sortation device as set forth in claim 1 wherein the at least one conveyor includes a first belt and a second belt and wherein at least one of the first and second belts can be moved relative to the other of the first and second belts.

3. The sortation device as set forth in claim 2 wherein the first belt is an upper belt and the second belt is a lower belt that is located vertically below the upper belt.

4. The sortation device as set forth in claim 3 wherein the lower belt can move from a first position that is directly below the upper belt and a second position with the lower belt extending past the upper belt.

5. The sortation device as set forth in claim 4 wherein the lower belt includes at least two pulleys that are operably coupled with at least one pulley track that guides the movement of the lower belt relative to the upper belt.

6. The sortation device as set forth in claim 1, wherein the first and second shipping containers are arranged adjacent one another in a direction of extension of the at least one conveyor.

7. The sortation device as set forth in claim 1, wherein the swing gates that are located along the track, and wherein the swing gates are able to articulate between a non-deflecting position and a deflecting position, and wherein the swing gates can deflect the packages from the track to the conveyors when the swing gates are in the deflecting position.

8. A method of dispensing a plurality of packages into a plurality of shipping containers, comprising the steps of:
preparing a track and a plurality of conveyors that extend at angles away from the track towards respective sets of shipping containers, each of the sets of shipping containers including a first shipping container and a second shipping container;
guiding the plurality of packages along the track;
deflecting at least one of the packages from the track onto a first conveyor of the plurality of conveyors and then into the first shipping container of the respective set of shipping containers;
extending the first conveyor; and
deflecting at least one of the packages onto the first conveyor and then into the second shipping container of the respective set of shipping containers.

9. The method as set forth in claim 8 wherein the first conveyor includes a first belt and a second belt, and wherein the step of extending the first conveyor includes moving one of the first and second belts relative to the other of the first and second belts.

10. The method as set forth in claim 9 wherein the first belt is an upper belt and the second belt is a lower belt, and wherein
the step of extending the first conveyor includes moving the lower belt from a retracted position vertically below the upper belt to an extended position where the lower belt extends outwardly past an end of the upper belt.

11. The method as set forth in claim 10 wherein the lower belt includes at least two pulleys that are disposed along at least one pulley track and wherein movement of the lower belt involves moving the at least two pulleys along the at least one pulley track.

12. The method as set forth in claim 8 wherein each of the plurality of conveyors is extendable and retractable and is configured to deposit packages into one shipping container when in a retracted condition and into another shipping container when in an extended condition.

13. The method as set forth in claim 12 wherein the plurality of conveyors can be extended and retracted independently of one another.

14. The method as set forth in claim 8 further including the step of determining with a controller if a trigger event has occurred and wherein the step of extending the at least one conveyor takes place in response to the controller determining that the trigger event has occurred.

15. The method as set forth in claim 14 wherein the trigger event is a predetermined time.

16. A package sortation assembly, comprising:
a main track for handling a plurality of packages;
a plurality of sets of shipping containers, the plurality of sets of shipping containers including at least two shipping containers arranged adjacent one another;
a plurality of conveyors that are spaced apart from one another along the main track, the conveyors extending at angles relative to the main track from the main track towards respective ones of the sets of shipping containers, the conveyors being individually extendable and retractable;
a plurality of swing gates for redirecting the packages from the main track onto the plurality of conveyors; and
a controller in communication with the plurality of conveyors and configured to selectively extend and retract the conveyors to control which shipping containers in the sets the packages are dispensed into.

17. The package sortation assembly as set forth in claim 16 wherein each conveyor of the plurality of conveyors includes a first belt and a second belt and wherein at least one of the first and second belts can be moved relative to the other of the first and second belts.

18. The package sortation assembly as set forth in claim 17 wherein the first belt is an upper belt and the second belt is a lower belt that is located vertically below the upper belt.

19. The package sortation assembly as set forth in claim 18 wherein the lower belt can move from a first position that is directly below the upper belt and a second position with the lower belt extending past the upper belt.

* * * * *